Feb. 21, 1961

R. P. LAPSLEY 2,972,658

DYNAMICALLY BALANCED, ALTERNATING-CURRENT
ELECTRIC CONDUCTORS

Filed Oct. 28, 1957

INVENTOR.
Rhea P. Lapsley
BY James G. Bethell
Attorney.

Feb. 21, 1961 — R. P. LAPSLEY — 2,972,658
DYNAMICALLY BALANCED, ALTERNATING-CURRENT ELECTRIC CONDUCTORS
Filed Oct. 28, 1957 — 5 Sheets-Sheet 2

INVENTOR.
Rhea P. Lapsley
BY James P. Bechell
Attorney.

Feb. 21, 1961 R. P. LAPSLEY 2,972,658
DYNAMICALLY BALANCED, ALTERNATING-CURRENT
ELECTRIC CONDUCTORS
Filed Oct. 28, 1957 5 Sheets-Sheet 3

INVENTOR.
Rhea P. Lapsley
BY James C. Bethell
Attorney.

Feb. 21, 1961

R. P. LAPSLEY 2,972,658

DYNAMICALLY BALANCED, ALTERNATING-CURRENT
ELECTRIC CONDUCTORS

Filed Oct. 28, 1957

INVENTOR.
Rhea P. Lapsley
BY James G. Bethell
Attorney.

Feb. 21, 1961

R. P. LAPSLEY 2,972,658

DYNAMICALLY BALANCED, ALTERNATING-CURRENT ELECTRIC CONDUCTORS

Filed Oct. 28, 1957

INVENTOR.
Rhea P. Lapsley
BY James E. Beshell
Attorney.

United States Patent Office 2,972,658
Patented Feb. 21, 1961

2,972,658

DYNAMICALLY BALANCED ALTERNATING-CURRENT ELECTRIC CONDUCTORS

Rhea P. Lapsley, Ridgewood, N.J., assignor to The Okonite Company, Passaic, N.J., a corporation of New Jersey Filed Oct. 28, 1957, Ser. No. 692,616

11 Claims. (Cl. 174—114)

My invention is directed to improvements in alternating-current electric conductors.

One object of my invention is to provide an alternating-current electric conductor of such construction that the conductor inherently will have lower alternating-current resistance and lower losses and, hence, will carry more load current than comparable conventional alternating-current electric conductors.

Another object of my invention is to provide an alternating-current electric conductor construction which, because of low inherent alternating-current losses, will economically permit of a substantial increase in conductor cross-section above present economical maximum sizes.

In my co-pending application Serial No. 684,967, filed September 19, 1957, I have disclosed alternating-current electric conductor constructions wherein a more uniform distribution of alternating current is obtained throughout the cross-section of large conductors than with conductors of conventional construction, thereby reducing the alternating-current losses in the conductor. In that application I divide the conductor cross-section into a plurality of electrically isolated areas and transpose the connections of these areas at the joints between adjacent lengths, thereby making the circuit-length impedances of the series-connected paths equal, hence forcing the current to distribute more evenly over the conductor cross-section.

The instant invention provides alternating-current conductors which are so constructed as inherently to be dynamically balanced for the desired conductor size and conditions of operation, so as not to be dependent upon transposition of joint connections.

In the accompanying drawings.

In stranded conductors carrying direct-current, the current density among strands is such that the lowest attainable losses are produced, this condition being reached when the IR counter-electro-motive forces of all strands are equal, and for any of the usual conductor materials, such as copper or aluminum, for instance, the resistance of the conductor is substantially proportional to the conductor temperature and inversely proportional to the metallic content of the conductor for any given conductor length.

In alternating-current electric conductors, however, operating at any given frequency, it is well established that the alternating-current resistance of a conductor is greater than the direct-current resistance of the same conductor at the same temperature. The basic reason for the fact that the alternating-current resistance in large concentric conductors, for example, is far higher than the direct-current resistance is a shift of current within the conductor, which decreases current density near the conductor center and increases current density at the outer portions of the conductor, which causes the IR counter-electro-motive force of the various strands to be non-uniform. The expressions "IR counter-electro-motive force" or "IR counter-electro-motive forces," for brevity and clarity of description, will be referred to hereinafter as "IR drop" or "IR drops." This non-uniformity or shift of current in the conductor itself, is known in the industry as "skin effect." The larger the conductor diameter and the higher the current frequency, the greater the skin effect; and the higher the skin effect, the greater are the losses within a given conductor for any given alternating-current value.

If other conductors carrying alternating current are in close proximity to a conductor under consideration, there is an additional increase in current shift and, hence, an increase in the differences of current density within the conductor, so that there will be additional losses within the conductor for a given current loading. This further increase in alternating-current/direct-current resistance ratio is due to what is known in the industry as "proximity effect."

If a conductor under consideration is encased in magnetic material, such as a steel pipe or steel tapes, for example, the alternating-current/direct-current resistance ratio will be increased still more, resulting in higher losses within the conductor. These losses have been assumed by the industry to be generated primarily in the encasing material rather than in the conductor.

I have found, however, as opposed to this assumption, that the basic reason for the major portion of the additional resistance and losses in a conductor carrying alternating current, when other conductors carrying alternating current are in close proximity to the conductor under consideration, and/or when the conductor is encased in magnetic material, is a further shift of current within the conductor, whereby the differences of current density within the conductor are increased. This, in reality, is an extension or intensification of skin effect, at least for stranded conductors in which the strands are oiled, anodized, or otherwise have an insulating or high-resistance film on the surface.

This shift of current within the conductor is due to the counter-electromotive force being higher at those portions of the conductor where the magnetomotive force is low than at those portions of the conductor where the magnetomotive force is high. I have found that the so-called pipe losses in pipe-type cables are in the main due to the same cause as skin and proximity effects, viz., to current shift in the conductor.

My invention provides conductor constructions wherein skin effect, proximity effect, and effect due to encasement of the conductor in magnetic material, such as a steel pipe or steel tapes, for example, are minimized. Some small losses may be generated in the pipe of pipe-type cables due to hysteresis and circulating current, but for clarity of description these losses will be neglected herein.

Prior to my invention, attempts have been made to reduce the skin and proximity effects in large-size electric conductors, one of the first of these attempts being the rope-core conductor. This was followed by the stranded, segmental conductor. The segmental conductor has a higher volume efficiency and, therefore, for a given metallic content occupies less space and, hence, is an improvement over the rope-core conductor but has substantial losses when large sizes are used in close proximity and especially in steel pipes, such as used in pipe cable systems.

The needs of the electrical industry are for larger and larger conductors, but even with segmental conductors the point has been reached where the losses become intolerably high, and where further substantial increase in size results in little or no increase in current-carrying capacity.

Figure 1:
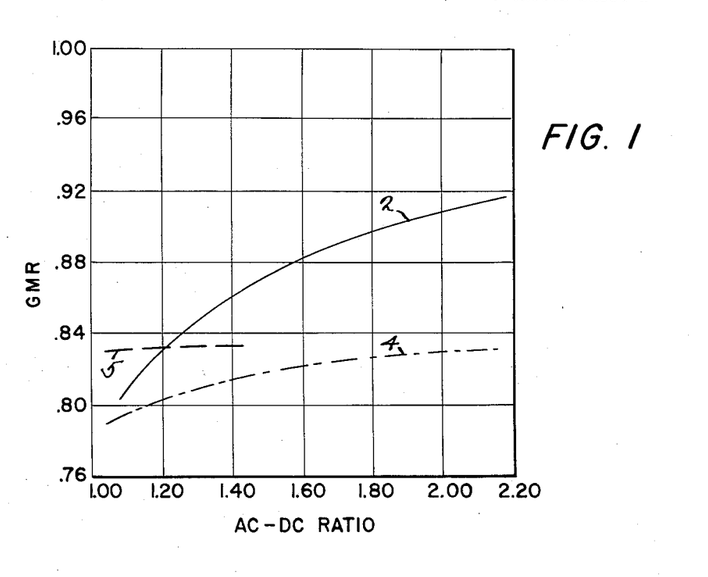
Fig. 1 is an explanatory graph.

In Fig. 1 of the accompanying drawings I have shown typical values of alternating-current/direct-current resistance ratio plotted versus the geometric mean radius or GMR of the conductor. The GMR of a conductor is a theoretical value used to calculate the inductive reactance of the conductor and is usually expressed as the radius of an infinitely thin, circular film, usually concentric with the central axis of the conductor, at which film, if all the current in the conductor were concentrated, the same total linkage of current by magnetic lines of force would be produced as is produced by the same current flowing through the conductor. This definition assumes, of course, that all other conditions are the same for both cases. For purposes of clarity I have expressed the GMR in Fig. 1 as the ratio of the radius of the infinitely thin, circular film to the radius of the conductor, and the curves in Fig. 1 are drawn on that basis.

It is to be appreciated, of course, that, because of current shift within the conductor, the GMR will change with current frequency, with conductor diameter, with lay-up of conductor strands, with shape of strands, and with volume efficiency of the conductor, viz., the percentage of conductor cross-section at right angles to the conductor occupied by the sum of the strand cross-sections taken at right angles to the strands. When two or more conductors carrying current are in close proximity or are surrounded by or are near magnetic materials, the GMR will change also. Consequently, it will be understood that conductors of different designs or different volume efficiencies may have different GMR values under the same operating conditions, and that two identical conductors operating under different conditions may have different GMR values.

The solid curve, designated 2, in Fig. 1 of the accompanying drawings is typical of GMR of a concentric conductor, and it will be seen that, as the A.C./D.C. resistance ratio increases, the values of GMR increase. This is true of solid conductors and of concentrically stranded conductors of conventional design. This GMR change is caused by a shift of current, giving a reduction in current density at the center portion of the conductor and an increase in current density in the outer portion of the conductor. This shift of current can be caused by increase in current frequency or by change in proximity to other cables or by encasement in magnetic material whereby the inductance of the conductor is varied.

I have found that for a typical segmental cable of conventional design the curve of GMR versus A.C./D.C. resistance ratio has the general shape of the broken-line curve 4 in Fig. 1. It is to be noted that the values of GMR as indicated by curve 4 are somewhat smaller than for the concentric or solid conductor as indicated by the curve 2. It is to be appreciated that the curves 2 and 4 of Fig. 1 are typical of the total effective GMR of the conductor when each strand and/or layer of strands may be carrying different values of current. This comparison shows that, even though both the segmental and concentric constructions may have high A.C./D.C. ratios, the current distribution patterns in the two constructions are quite different, as evidenced by the differences in GMR. The lower values of GMR for the segmental construction, as compared with the higher values of GMR for the concentric construction, show that in the segmental construction there is more current flowing near the cable center than in a corresponding concentric construction. The fact that segmental constructions have high A.C./D.C. ratios indicates current shifts, but a comparison of the two curves shows that the shift from center strands to outer strands within the segment does not shift the current as far away from the conductor center as in the concentric construction. The instant invention provides constructions in which the tendency for undesirable current shifting is substantially eliminated.

At commercial current frequency, for example 60 cycles, and at constant conductor temperature, the A.C./D.C. resistance ratio in a concentric, stranded conductor is apparently unaffected (or the effect is negligible) by change in total current within the conductor. As distinguished from this, however, I have observed that the A.C./D.C. resistance ratio of segmental, stranded conductors of conventional design, a four-segment conductor for example, changes perceptibly with changes for various values of current, the A.C./D.C. resistance ratio being smaller for high current values than for low current values. I have found also that, in segmental conductors, the reactance changes with current values and is slightly lower for low values of current than for high values.

In commercial conductors in use today the different strands of the conductor and/or layers of strands are subjected to large differences of inductance, causing the current to flow unequally on the different strands and/or layers of strands. However, with a segmental conductor the differences in inductance of the several strands are not as severe as in the concentric conductor, as can be inferred from a comparison of curves 4 and 2 of Fig. 1. At low values of 60-cycle current the inductance differences, even in a segmental conductor, are predominant and cause current to flow predominantly on the outer strands of the segments, the same as in a concentric conductor. However, at high values of 60-cycle current I have found that the differences in IR drop of the strands carrying different currents, acting in quadrature to the IX counter-electromotive force, (IX drop), as in a circle diagram, tend to restore more equal distribution of current among the various conductor strands and, hence, reduce severe differences in IR drops, resulting in a lower A.C./D.C. ratio. For wide changes of total conductor current, particularly when segmental conductors are enclosed in pipe, this effect of variation of current on conductor resistance, or A.C./D.C. resistance ratio, is measurable for segmental conductors at commercial frequencies.

By proper conductor construction, in accordance with my invention to fit the conditions of use, the inductance of each of the conductor strands can be made more nearly equal or less non-uniform, and the curve of GMR versus A.C./D.C. resistance ratio over the range of operating conditions for which the conductor is intended will approach a relatively flat line, as indicated by the broken line 5 of Fig. 1, the relatively constant GMR value indicating in this case greatly reduced tendency for undesirable current shifting. In such a conductor, if perfectly constructed, the GMR versus A.C./D.C. resistance ratio would, of course, be a dot at an A.C./D.C. resistance ratio of 1.00, indicating an ideal current distribution somewhere between GMR values of .779 and 1.00, rather than the relatively flat line 5, except there will remain the current shifts within individual strands, inasmuch as at any point along the side of an individual strand nearest the point of lowest inductance the current density will be higher than at the opposite side of that strand. This will cause a slight change in total inductance and GMR of the conductor, which will be accompanied by some increase in A.C./D.C. resistance ratio. While this can be minimized to any degree desired by using smaller and smaller strands, this property of the current to shift within an individual strand should be taken into consideration to obtain the desired optimum design.

The conductor construction provided by my invention is such that the forces tending to shift the current from the strands of the center layer toward the strands of the outer layer of a conductor or segment of a conductor are substantially balanced by forces tending to shift the current from the strands of the outer layer toward the strands of the central layer, so that the conductor approaches dynamic balance. A multi-layer conductor so constructed as to carry a current load so distributed that the IR drop of every strand equals the IR drop in every other strand within the conductor when operating at a specified frequency, for example 60 cycles, with a specified spacing between conductors, and under other specified conditions, such as for example in pipe or with its sheath bonded or open-circuited, is inherently dynamically balanced for those conditions, and, because of this ideal distribution of current density, will have an A.C./D.C. resistance ratio of a low order and approaching that due only to shift of current within individual strands, as shown by curve 5 of Fig. 1.

Figure 2:
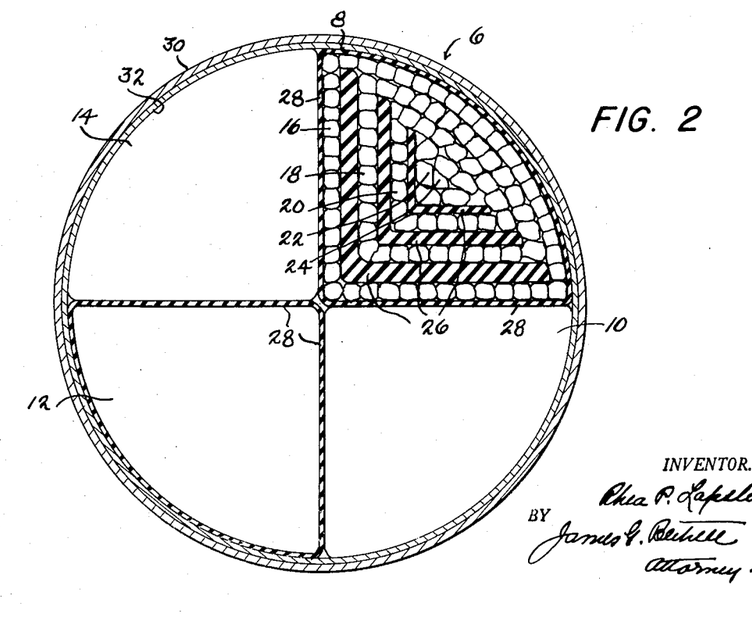
Fig. 2 is an end view of a segmental, alternating-current electric conductor constructed in accordance with my invention.

Referring to the accompanying drawings, Fig. 2 shows an alternating-current, segmental, electric conductor 6, constructed in accordance with one embodiment of my invention. For illustrative purposes but not by way of limitation, I have shown the conductor as composed of four segments, designated 8, 10, 12, and 14, respectively. Inasmuch as the segments are identical in construction, only one of them, segment 8, has been shown in full and will be described in detail. As illustrated, the segment is composed of strands of any suitable conductor metal, such as copper or aluminum, for example, arranged in nested concentric sector layers 16, 18, 20, and 22, laid up about the center strand 24 of the segment. Spacers 26, radiating from the apexes of the layers, are provided between adjacent strand layers along the flat sides of the layers. The apex of a layer is the portion of that layer which lies closest to the conductor axis. The several conductor segments are cabled toegther, each segments being so shaped that the flat faces of adjacent segments will abut so as to form the desired conductor shape when the segments are cabled together.

Any conductor material normally has, or when exposed to oxygen develops, some oxide on its surface, which to some extent is an insulating coating. The heat treatment normally associated with the drying and impregnating of paper-insulated cables and the oil film between conductor strands conventionally associated with paper-insulated cable impregnation also give some insulating properties to the surface of individual conductor strands. Where conductors are of small or medium size and the strands are crushed flat and/or the layers of strands are spiraled in the same direction to give broad contact areas and low unit area contact pressure between strands, this strand surface insulation is sufficient to prevent current transfer being strands. However, as the physical size of the conductor is increased and/or the current being carried is heavy and/or other current-carrying cables are in close proximity and/or the cable is encased in magnetic pipe, the voltages between adjacoent conductor strands, between the sector layers 16, 18, 20, and 22 or between the conductor segments 8, 10, 12, and 14 at certain locations within the conductor cross-section can become high enough to break down the oil and/or other film above referred to associated with the oxidizing or drying and impregnating of paper-insulated cable. Under such conditions, it is necessary, of course, to provide a suitably mechanically strong film with adequate dielectric properties to resist damage or breakdown from the mechanical strain incident to cable manufacture, installation, and operation, and to maintain dielectric insulation between strands, layers, and segments at the highest values of voltage differential between adjacent strands, layers, and segments encountered in service. Inasmuch as the voltage differential will be very small between the strands of the same layer within the same segment, usually of the milli-volt class, and small, although somewhat higher between sector layers and between segments, almost any positive insulating means adequate to maintain mechanical integrity during manufacture, installation, and operation will be adequate from a dielectric standpoint. For example, by enameling the strands and/or serving the strands with cotton, or glass servings, good strand insulation is provided, while layers of paper or mylar film or anodized aluminum tape, as shown at 28, provide ample segment insulation. When any of these auxiliary insulating media is employed to supplement the natural insulation provided by low-pressure contact between adjacent elements, or to supplement the insulation provided by oxidation and/or the drying and impregnating treatment, it is preferable that the media be as thin as possible commensurate with adequate mechanical and electrical properties.

The spacers 26, which space the sector layers of each conductor segment, may be of any suitable non-magnetic material, such as paper, plastic, or anodized aluminum, for example, and, while these spacers inherently have some insulating quality and have been so illustrated, and will prevent current transfer between layers at the locations of the spacers, they will be considered herein only in their role as spacers, it being appreciated that other and adequate insulating means, whether or not shown in the drawings, will be present to prevent current transfer between strands, sector layers, and segments.

The segments 8, 10, 12, and 14 of the conductor are cabled together and may be held together and maintained in the desired close proximity by the usual binder tape 30 of metallized paper, semiconducting coated fabric, or non-magnetic metal tape, for example. When metal tape is employed as a binder tape, it may be desirable in some instances to interpose a semi-conducting layer, such as 32, of semi-conducting paper, for example, between the binder tape and the conductor.

It will be seen from the drawing and from the description thus far given that each segment of my improved conductor comprises a plurality of nested, annular, sector-shaped layers, the insulated strands of each layer lying side by side without spaces between them, the strands of each layer composing the arcuate portion of each layer included between the flat sides of each sector-shaped layer having no spaces between them and the corresponding strands of the adjacent layer, while the several layers are spaced from each other along their flat sides or faces by the spacers 26, which are so proportioned that the desired results are obtained.

The conductor 6 may be an uninsulated conductor for installation on insulating supports, or it may be insulated with any of the usual commercial insulations in the usual way. In some instances, the insulation and/or other media surrounding the conductor make the binder 30 unnecessary.

Due to the manner in which a segmental conductor is constructed, an individual strand occupies many different positions along the length of the conductor. The circuit-length inductance of that strand is determined by the series accumulation of the linkage conditions at every point along that strand. In the segmental conductors which are in use today, the strands in the center portion of the segments have a far greater circuit-length inductance than do the outer strands of the segment. This greater circuit-length inductance is due to the fact that over the entire length of the strand, the total linkage of current by magnetic flux is much greater in a strand at the center of a segment than it is for a strand in the outer layer of a segment. This unequal condition of total linkage is the primary cause for current shifts within the conductor. The current that any strand carries is determined by its total impedance, since the voltage drop between conductor terminals must be the same for every strand. This increased inductance of the inner strands causes the total impedance of the inner strands to be much higher than the total is for the outer strands; therefore, the inner strands carry a much smaller current load than do the outer ones, and there is a large variation in the IR drops of the conductor strands.

In my invention, the spacers 26 serve the purpose of controlling the total linkage of every strand in the conductor in order to produce equal IR drops in each strand of the conductor.

The best attainable design for any conductor, operating under given conditions, that is, the design with the lowest possible losses, would be the design which distributes the current so that the IR drops are equal for each strand. It should be noted that, when the IR drops of all strands are equal, their IX drops will also be equal, since their total drops (IZ counter-electro-motive forces) must be equal, as all strands are connected together at their terminals. But equal IR and IX drops imply that all the currents are in phase. This phenomenon is analogous to the direct-current phenomenon, except that there are still current shifts within individual strands. The direct-current condition can be approached by using smaller and smaller strands.

When the several conductor segments 8, 10, 12, and 14 are cabled together to form the conductor, it will be appreciated that each segment twines around the conductor axis and occupies all positions around this axis for substantially equal portions of the conductor length. It, therefore, follows that each segment will have the same resistance and reactance, and current will flow equally among the segments. Furthermore, the current-distribution patterns among layers will be identical for all segments. Each of the identical strands in layer 16 of segment 8 twines around in a fixed pattern within the segment, and every strand occupies each position within this pattern for equal portions of the conductor length. It, therefore, follows that each strand of layer 16 of segment 8 will have the same resistance and reactance, and current will flow equally among the strands of layer 16 in segment 8. As all segments are identical to segment 8 and twine around the conductor axis in a like manner to segment 8, each strand of the layers 16 in the other segments will also have the same resistance and reactance as the strands of layer 16 in segment 8, and current will divide equally among all strands in layers 16 in all segments of the conductor.

Each strand of layer 18 of segment 8 also twines around in a fixed pattern within segment 8, and for the reasons discussed above all strands in layer 18 in all segments will have the same resistance and reactance, and current will divide equally among the strands in the layers 18 in all segments.

In a like manner it can be shown that current will divide equally among the strands of the layers 20 in all segments, and equally among the strands of the layers 22 in all segments, and equally among the center strands 24 in all segments.

Although the strands of a single layer are identical, those of other layers may differ in cross-section and/or in length. These differences, as well as different degrees of current shifting within individual strands at their various positions within the conductor cross-section along the conductor length, imply that the circuit-length resistances of the strands are not equal for strands in different layers.

In Fig. 2, I use spacers 26 between the layers to control the current-distribution pattern so as to produce equal IR drops in all strands and, hence, provide a dynamically balanced conductor, it being understood that the spacers are so proportioned that the desired results are attained. It should be noted that, if the spacers are too large, the current will shift too much toward the inner strands, and the A.C./D.C. ratio of the conductor will again increase.

It is to be appreciated that for large conductors in close proximity there will be a decided difference in the strength of the inductive field across the conductor due to the proximate conductor. This difference may be great enough to have to be taken into account to get the ultimate desired dynamic balance.

It is to be appreciated furthermore that the current will shift within each individual conductor strand, this shift being dependent on the field strength of the conductor, the proximate conductors, and/or pipe effect, as well as the position of the strand in the conductor at the conductor cross-section under consideration. This current shift in individual strands will also have to be taken into account to obtain a dynamically balanced conductor.

It will be appreciated that to calculate a balanced design for a cable composed of one hundred strands, for example, would take many thousands of computations and would involve some assumptions. To avoid these computations and assumptions and yet obtain a conductor construction which will give the desired balance, I subject test lengths of conductors, equipped with various sizes of my spacers, to a range of frequencies and currents and at different spacings between test conductors and measure the inductance and resistance of the conductor at each spacing and/or frequency and current and measure the distribution of current among layers. The amount and direction by which the measured curves of inductance versus spacing, current or frequency depart from the theoretical ideal curves and the change in GMR versus changes in resistance, due to shift of current among layers, are measures of the unbalance, as graphically illustrated in the curves of Fig. 1. The conductor construction can be modified in the direction indicated by analysis of such test results until the optimum design is attained as shown by minimum A.C./D.C. ratio under the desired conditions of operation.

Figure 3:
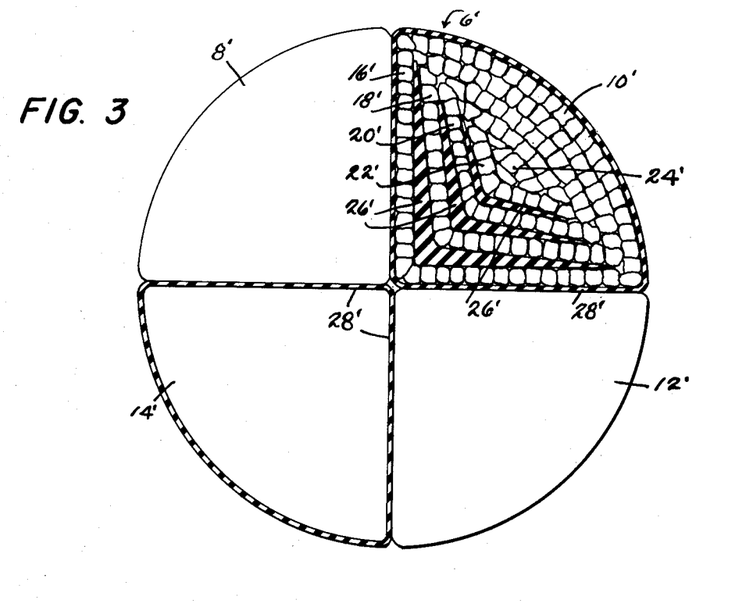
Fig. 3 is a view similar to Fig. 2 showing a modification of the construction employed in Fig. 2.

In the embodiment of my invention illustrated in Fig. 3 I have shown a conductor 6' made up of four identical segments 8', 10', 12', and 14'. Each segment is divided into nested sector layers 16', 18', 20', and 22', laid up about a group of center strands 24'. The sector layers are spaced from each other along their flat faces by spacers 26' of material similar to that referred to in connection with the spacers 26 of Fig. 2. If the conductor segments are to be insulated from each other, I may employ layers of paper or mylar for this purpose, as shown at 28'. The conductor may be completed in any of the usual commercial ways, as discussed in connection with Fig. 2. The construction illustrated in Fig. 3 differs from that shown in Fig. 2 in that the spacers 26', radiating from the apexes of the layers, gradually diminish in thickness toward the conductor periphery, instead of being of constant thickness as in Fig. 2, thereby attaining a higher degree of dynamic balance with the same total area of spacers, or the same degree of balance with less total area of spacers.

Figure 4:
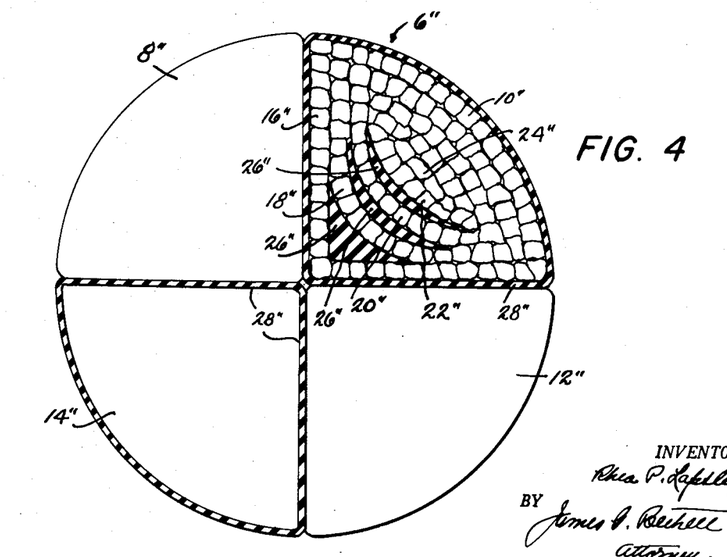
Fig. 4 is a view similar to Fig. 2 showing still another embodiment of my invention.

In the modified conductor of Fig. 4, I have shown a conductor 6" divided into identical segments 8", 10", 12", and 14". Each segment is divided into nested sector layers 16", 18", 20", and 22", laid up about center strands 24". The sector layers are spaced from each other along their flat faces by spacers 26" radiating from the apexes of the layers. These spacers not only diminish in thickness toward the conductor periphery but terminate a substantial distance short of the arcuate perimeter of the layers. The segments may be insulated from each other by paper or mylar 28'', for example. The binder tape and semi-conducting tape referred to in connection with Fig. 2 may be employed; likewise it is to be understood that the conductor may be insulated or uninsulated, as explained in connection with the embodiment of Fig. 2.

Figure 5:
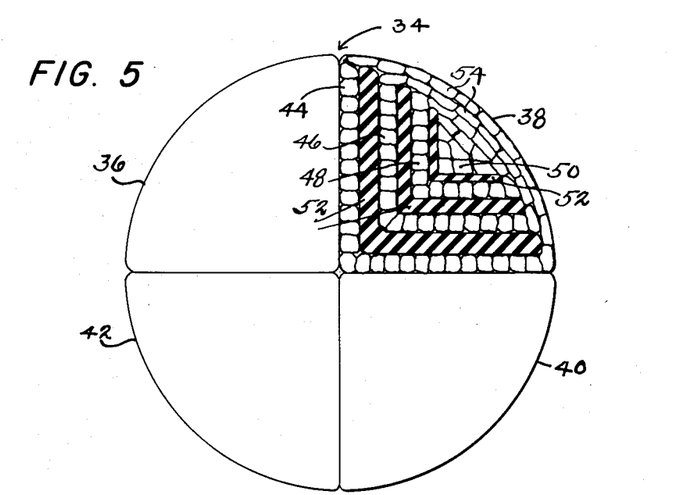
Fig. 5 is an end view of a conductor illustrating a further embodiment of my invention.

In Fig. 5 I have shown another embodiment of my invention in which the conductor 34 is of the segmental, stranded type, the several conductor segments being designated 36, 38, 40, and 42, respectively. Each segment of the conductor is divided into sector strand layers 44, 46, 48, and 50, spaced from each other along their flat sides by spacers 52, radiating from the apexes of the layers, similar to the spacers 26 of Fig. 2. As will appear from the drawing, in this embodiment of my invention the conductor strands 54 at the arcuate portion of each of the conductor segments are more highly compacted than the strands at the flat faces of the segments. The conductor may be finished as desired, as pointed out in connection with Fig. 2.

Figure 6:
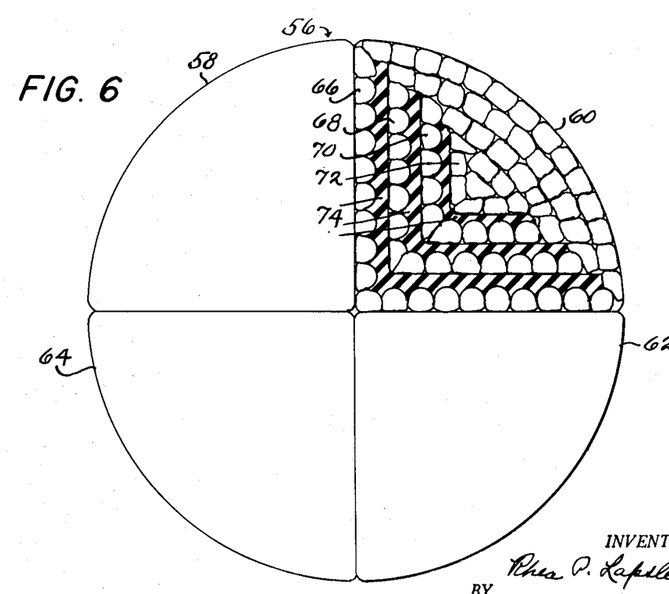
Fig. 6 is an end view of a conductor constructed in accordance with another embodiment of my invention.

In the embodiment of my invention as illustrated in Fig. 6, the conductor 56 is of the segmental, stranded type, the several conductor segments having been designated 58, 60, 62, and 64, respectively. Each segment is made up of nested sector layers 66, 68, 70, and 72, spaced along their flat sides by spacers 74, radiating from the apexes of the layers. These spacers are of compactible material, such as low-density paper, for example. In the manufacture of this conductor, when the several layers of strands are applied and run through the forming and/or compacting rolls, the spacers 74 will be crushed down and cushion the strands, thereby aiding in maintaining the original shape of the strands adjacent the spacers. This, in effect, gives a low-volume density of conductor metal along the flat faces of the sector layers, while maintaining a high-volume density of conductor metal at the conductor periphery. The conductor may be finished in any desired manner, as pointed out in connection with Fig. 2, the binding tape and insulation, if any, having been omitted for clarity of illustration.

Figure 7:
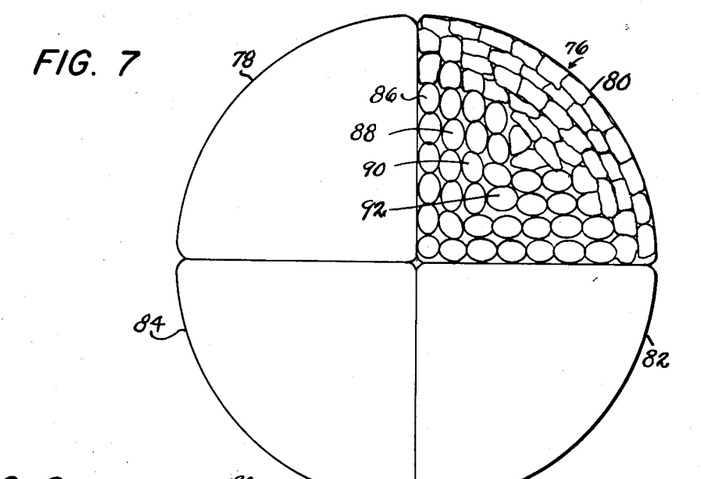
Fig. 7 is an end view of still another embodiment of my invention.

In Fig. 7 I have shown a conductor construction in which the spacers of the other constructions already described have been omitted. Referring to this embodiment of my invention, the conductor 76 is of the segmental, stranded type, the several conductor segments having been designated 78, 80, 82, and 84. Each segment is composed of nested sector layers 86, 88, 90, and 92, spaced from each other discontinously by a fluid, such as air, for example, instead of by spacers such as referred to in connection with the other embodiments of my invention already described. By employing compacting rolls of special design, sufficient spaces are provided between the sector layers, so that in the finished conductor I am able to obtain effects very similar to those obtained in a construction such as illustrated in Fig. 6, for example. Again it is to be noted that the conductor may or may not be taped or insulated, as explained in connection with Fig. 2.

Figure 8:
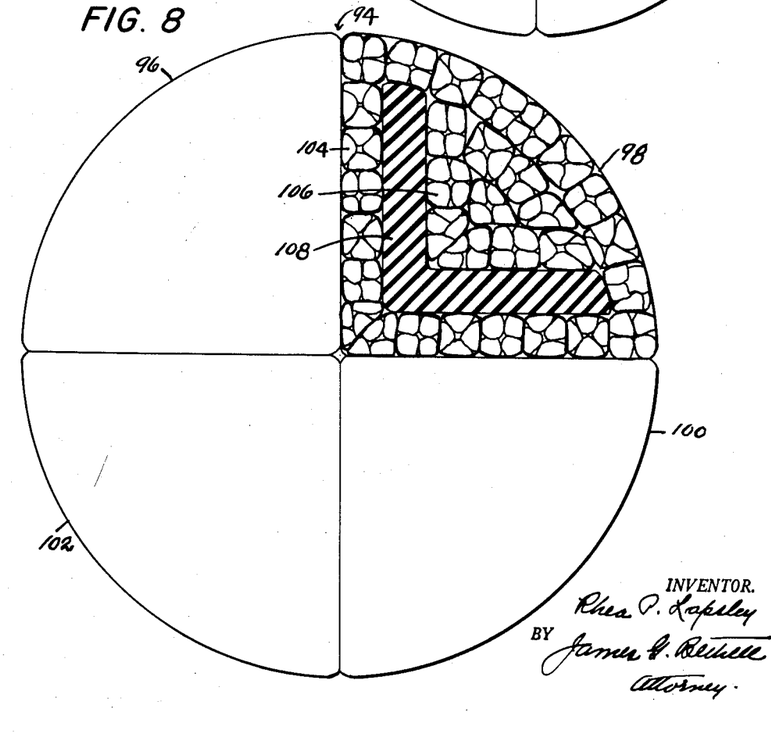
Fig. 8 is an end view of another embodiment of my invention.

Fig. 8, illustrating another embodiment of my invention, shows a conductor 94 made up of segments 96, 98, 100, and 102, each comprising vested sector layers 104 and 106, spaced along their flat sides by spacers 108, radiating from the apexes of the layers, of the same or like material as employed in the embodiments already described, Fig. 2, for example. In the embodiment of Fig. 8 it will be seen that the concentric sector layers 104 and 106 are made up of groups of twisted-together strands.

Figure 9:
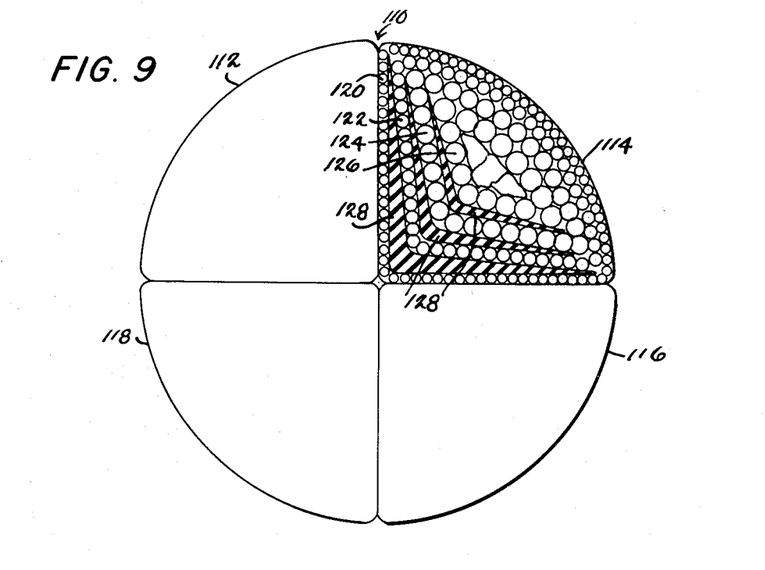
Fig. 9 is an end view of still another embodiment of my invention in which the strands making up the sector layers of each segment of the conductor increase in diameter toward the center of each conductor segment.

Fig. 9 shows another embodiment of my invention comprising a segmental, stranded conductor 110, the segments of which have been designated 112, 114, 116, and 118, respectively. Each segment is divided into nested sector layers 120, 122, 124, and 126, spaced from each other by spacers 128, disposed along the flat sides or flat faces of the layers and radiating from the apexes of the layers. To take advantage of the balancing effects of the shift in current between sides of the individual strands of the conductor, the strands in each layer increase in diameter toward the center of each conductor segment. In other words, the strands composing sector layer 122 are of larger diameter than those composing sector layer 120, and those composing sector layer 124 are larger than those composing layer 122, etc. It will be appreciated that, inasmuch as the strands in layer 120 about the periphery of each of the conductor segments 112, 114, 116, and 118 are the smallest in diameter, the shift in current within the strands in layer 120 with varying currents will be small, whereas, with the strands of largest diameter at the segment center, the shift in the individual strands will be more. The spacers 128 are so proportioned that the conductor is dynamically balanced.

Figure 10:
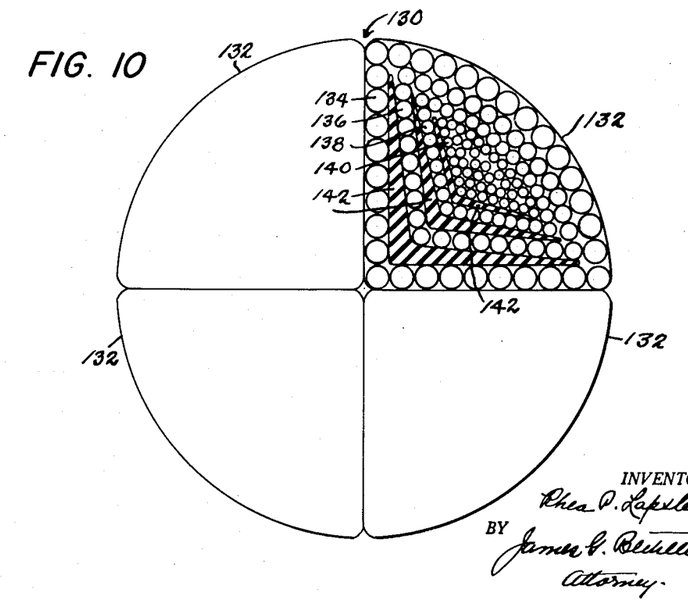
Fig. 10 is an end view of an embodiment of my invention in which the strands composing each conductor segment decrease in diameter toward the center of each conductor segment.

The conductor 130 of Fig. 10 is composed of segments 132, each made up of sector layers 134, 136, 138, and 140, spaced from each other by spacers 142, disposed along the flat sides of the layers and radiating from the apexes of the layers and so proportioned that the conductor is dynamically balanced. The strands in each layer decrease in diameter toward the center of each conductor segment.

From all of the foregoing it will be seen that I have provided various constructions in alternating-current conductors wherein the conductor is inherently dynamically balanced for the desired conductor size and operating conditions, so that the several strands of the conductor will carry currents that yield equal IR drops for all strands.

No attempt has been made to make the drawings to scale, it being understood, however, that in all cases the spacing of the sector layers of each conductor segment is such that the IR drops of the strands of the various layers are equal.

It is to be understood that any of the constructions herein disclosed may be employed with the coolant system and/or transposed connections of my co-pending application above referred to.

It is to be understood furthermore that changes may be made in the details of construction and arrangement of parts shown and described within the purview of my invention.

What I claim is:

1. An alternating-current, stranded electric conductor comprising a plurality of sector-shaped conducting segments cabled together; each of said segments comprising a plurality of individually insulated conducting strands so laid up as to provide a plurality of nested, sector-shaped, annular layers, each of which layers is composed of a plurality of strands lying side by side, the strands composing the arcuate portion of each layer between the flat faces of each layer lying close to the corresponding strands of the adjacent layer; and spacers disposed within the segment between the flat faces of adjacent layers and extending from the apex of each layer along the two flat faces of the layer, said spacers being so proportioned as to space the layers along their flat faces at such a distance apart that the IR drops of the strand currents within the several conductor strands approach uniformity, when the conductor is carrying current.

2. The conductor of claim 1 in which the spacers are so proportioned that, when the conductor is carrying current, the IR drop of each strand is substantially the same as the IR drop of all other strands of the conductor.

3. The conductor of claim 1 in which the spacers are uniform in thickness.

4. The conductor of claim 1 in which the spacers diminish in thickness from the apex of each sector-shaped layer toward the included arcuate portion of each layer.

5. The conductor of claim 1 in which the spacers diminish in thickness from the apex of each sector-shaped layer toward the included arcuate portion of each layer and terminate a substantial distance short of said arcuate portion.

6. The conductor of claim 1 in which the conductor strands composing the included arcuate portion of each layer are more highly compacted than the strands composing the flat sides of the layers.

7. The conductor of claim 1 in which the spacers are of compactible material.

8. An alterating-current, stranded electric conductor comprising a plurality of sector-shaped conducting segments cabled together, each of said segments comprising a plurality of individually insulated conducting strands so laid up as to provide a plurality of nested, sector-shaped, annular layers, each of which layers is composed of a plurality of strands lying side by side, the strands composing the arcuate portion of each layer being highly compacted, the remaining strands of each layer being so relatively disposed as to provide discontinuous spaces between the flat faces of adjacent sector layers, whereby, with the conductor carrying current, the IR drop of each strand is substantially the same as that of all other strands of the conductor.

9. An alternating-current, stranded electric conductor comprising a plurality of sector-shaped conducting segments cabled together; each of said segments comprising individually insulated conducting strands so laid up as to provide a plurality of nested, sector-shaped, annular layers, the strands composing each layer comprising groups of twisted-together strands, the strand groups of each layer composing the arcuate portion of each layer lying close to the corresponding strand groups of the adjacent layer; and spacers extending from the apex of each sector layer along the flat faces of each layer toward the arcuate portion of each layer, said spacers being so proportioned as to space the layers along their flat faces at such a distance apart that, with the conductor carrying current, the IR drop of each strand is substantially the same as that of all other strands of the conductor.

10. An alternating-current, stranded electric conductor comprising a plurality of sector-shaped conducting segments cabled together; each of said segments comprising a plurality of individually insulated conducting strands so laid up as to provide a plurality of nested, sector-shaped, annular layers, each of which layers is composed of a plurality of strands lying side by side, the strands of each layer composing the arcuate portion of each layer lying close to the corresponding strands of the adjacent layer, the strands composing any layer being larger than the strands of the surrounding layers; and spacers disposed between the flat faces of adjacent layers, said spacers extending from the apex of each layer along the two flat faces of the layer toward the included arc portion of each layer and being so proportioned as to space the layers along their flat faces at such a distance apart that, with the conductor carrying current, the IR drop of each strand is substantially the same as that of all other strands of the conductor.

11. An alternating-current, stranded electric conductor comprising a plurality of sector-shaped conducting segments cabled together; each of said segments comprising a plurality of individually insulated conducting strands so laid up as to provide a plurality of nested, sector-shaped, annular layers, each of which layers is composed of a plurality of strands lying side by side, the strands of each layer composing the arcuate portion of each layer lying close to the corresponding strands of the adjacent layer, the strands composing any layer being smaller than the strands of the surrounding layers; and spacers disposed between the flat faces of adjacent layers, said spacers extending from the apex of each layer along the two flat faces of the layer toward the included arc portion of each layer and being so proportioned as to space the layers along their flat faces at such a distance apart that, with the conductor carrying current, the IR drop of each strand is substantially the same as that of all other strands of the conductor.

References Cited in the file of this patent

UNITED STATES PATENTS

| | | |
|---|---|---|
| 1,904,162 | Milliken | Apr. 18, 1933 |
| 2,034,047 | Leibe et al. | Mar. 17, 1936 |
| 2,107,177 | Dudley | Feb. 1, 1938 |
| 2,125,869 | Atkinson | Aug. 9, 1938 |
| 2,187,213 | Milliken | Jan. 16, 1940 |
| 2,673,895 | Stieltjes | Mar. 30, 1954 |
| 2,792,442 | Parce | May 14, 1957 |

UNITED STATES PATENT OFFICE
CERTIFICATION OF CORRECTION

Patent No. 2,972,658                 February 21, 1961

Rhea P. Lapsley

It is hereby certified that error appears in the above numbered patent requiring correction and that the said Letters Patent should read as corrected below.

Column 2, line 19, for "concertic" read -- concentric --; column 5, line 52, for "toegther, each segments" read -- together, each segment --; line 69, for "being" read -- between --; line 73, for "adjacoent" read -- adjacent --; column 9, line 63, for "vested" read -- nested --.

Signed and sealed this 25th day of July 1961.

(SEAL)
Attest:

ERNEST W. SWIDER
Attesting Officer

DAVID L. LADD
Commissioner of Patents